(12) United States Patent
Drumm

(10) Patent No.: US 9,366,950 B2
(45) Date of Patent: Jun. 14, 2016

(54) METHOD AND PROJECTOR FOR PROJECTING AN IMAGE ONTO A PROJECTION SURFACE

(75) Inventor: Jan Oliver Drumm, Homburg (DE)

(73) Assignee: OSRAM GMBH, Munich (DE)

( * ) Notice: Subject to any disclaimer, the term of this patent is extended or adjusted under 35 U.S.C. 154(b) by 125 days.

(21) Appl. No.: 14/378,680

(22) PCT Filed: Feb. 15, 2012

(86) PCT No.: PCT/EP2012/052612
§ 371 (c)(1),
(2), (4) Date: Aug. 14, 2014

(87) PCT Pub. No.: WO2013/120522
PCT Pub. Date: Aug. 22, 2013

(65) Prior Publication Data
US 2015/0293436 A1 Oct. 15, 2015

(51) Int. Cl.
*G03B 21/26* (2006.01)
*G03B 35/22* (2006.01)
*H04N 9/31* (2006.01)
(Continued)

(52) U.S. Cl.
CPC ............... *G03B 35/22* (2013.01); *G02B 27/26* (2013.01); *G03B 21/2013* (2013.01); *G03B 21/2073* (2013.01); *G03B 21/26* (2013.01); *G03B 35/26* (2013.01); *H04N 9/3129* (2013.01);
(Continued)

(58) Field of Classification Search
CPC ........ G03B 21/00; G03B 21/26; G03B 35/22; G03B 35/26; H04N 13/0422; H04N 13/0459; H04N 13/0429; H04N 13/0003; H04N 9/3111; H04N 9/3129; H04N 9/3117; H04N 9/3105; H04N 9/44
See application file for complete search history.

(56) References Cited

U.S. PATENT DOCUMENTS 6,283,597 B1 9/2001 Jorke
2009/0190095 A1 7/2009 Ellinger et al.
(Continued)

FOREIGN PATENT DOCUMENTS

DE 102008063634 A1 6/2010
WO 2011053319 A1 5/2011

OTHER PUBLICATIONS

International Search Report issued in PCT/EP2012/052612 dated Oct. 11, 2012.
(Continued)

*Primary Examiner* — Sultan Chowdhury
(74) *Attorney, Agent, or Firm* — Viering, Jentschura & Partner mbB

(57) ABSTRACT

A method for simultaneously projecting two images onto a projection surface may include generating a first and second illumination beam based on first and second image data, which are representative of a first and second image, wherein the first illumination beam has electromagnetic radiation having a first property, wherein the second illumination beam has electromagnetic radiation having a second property, which differs from the first property, and deflecting the first and second illumination beams toward the projection surface so that the first illumination and second beam generates a first and second beam spot on the projection surface, respectively, wherein the first and second beam spot is moved over the projection surface so that with the aid of the first and second beam spot, the first and second image are displayed for a first and second observer on the surface, respectively, and the second image is superimposed on the first image.

15 Claims, 4 Drawing Sheets

(51) Int. Cl.
*H04N 13/04* (2006.01)
*G02B 27/26* (2006.01)
*G03B 21/20* (2006.01)
*G03B 35/26* (2006.01)

(52) U.S. Cl.
CPC ....... *H04N13/0431* (2013.01); *H04N 13/0434* (2013.01); *H04N 13/0459* (2013.01)

(56) References Cited

U.S. PATENT DOCUMENTS

| | | | | |
|---|---|---|---|---|
| 2011/0116054 A1* | 5/2011 | Wakabayashi | ....... | G02B 26/101 353/36 |
| 2012/0039072 A1 | 2/2012 | Lell et al. | | |
| 2012/0086915 A1* | 4/2012 | Rosen | ...... | G03B 21/26 353/30 |

OTHER PUBLICATIONS

Technical Report; "Safety of laser products—Part 13: Measurements for classification of laser products" ;IEC/TR 60825-13; edition 2.0; Oct. 2011; pp. 1-6.

"Ein Bildschirm, zwei Bilder"; c't Magazin; Jan. 13, 2012; pp. 1-1; URL:http://www.heise.de/ct/meldung/Ein-Bildschirm-zwei-Bilder-1412445.html; retrieved on Oct. 2, 2012.

* cited by examiner

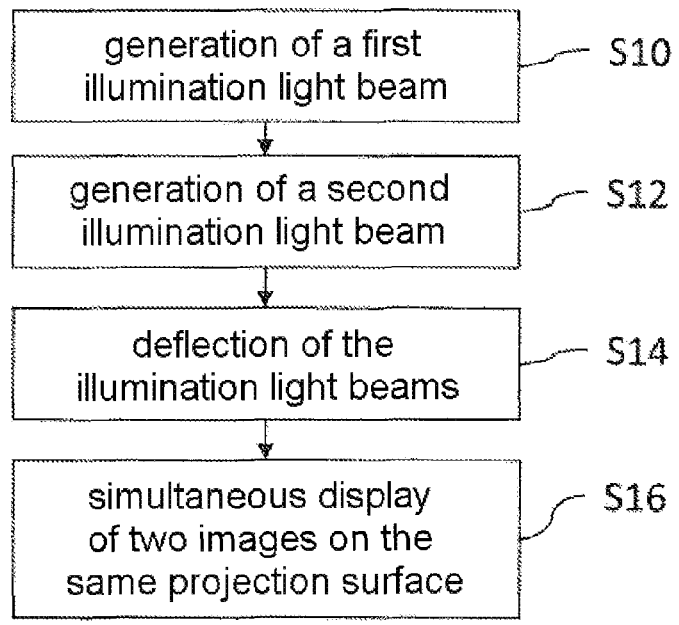
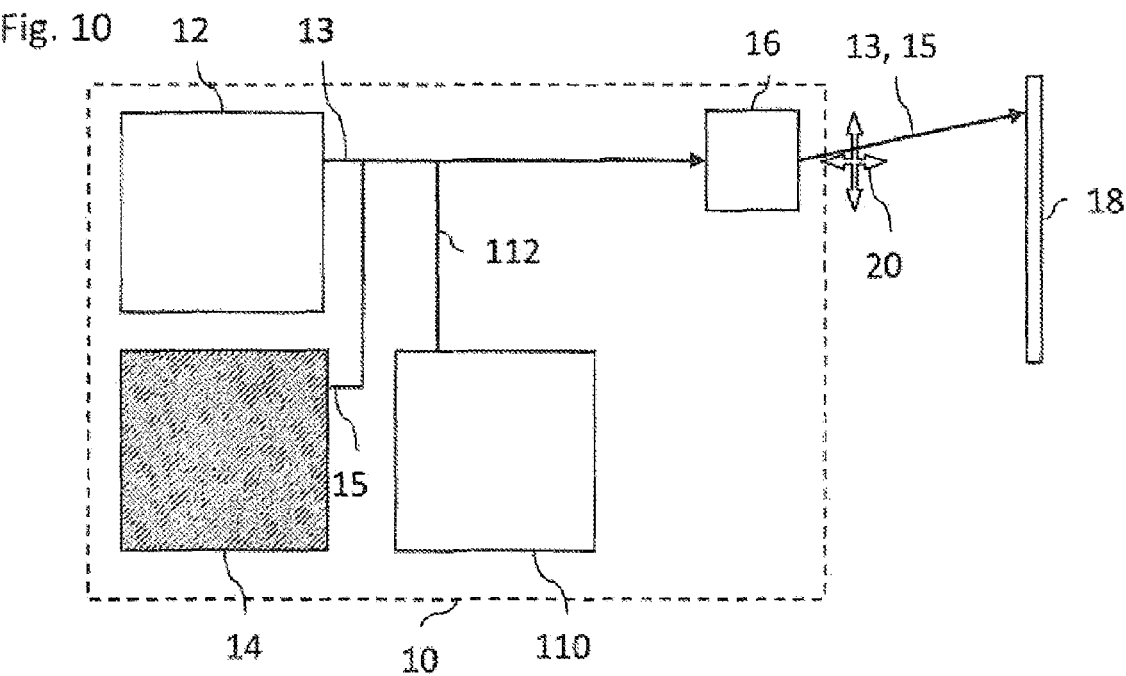

METHOD AND PROJECTOR FOR PROJECTING AN IMAGE ONTO A PROJECTION SURFACE

RELATED APPLICATIONS

The present application is a national stage entry according to 35 U.S.C. §371 of PCT application No.: PCT/EP2012/052612 filed on Feb. 15, 2012, and is incorporated herein by reference in its entirety.

TECHNICAL FIELD

Various embodiments relate to a method for simultaneously projecting two images onto a projection surface. A first image is displayed for a first observer and a second image is displayed for a second observer. Furthermore, Various embodiments relate to a projector for simultaneously projecting two images onto a projection surface.

BACKGROUND

One or two conventional projectors are conventionally used in the case of simultaneous projection of two images or two films onto a projection surface. The projector or projectors may then display the two images or films adjacent to one another, for example, recognizable for all observers simultaneously.

Projecting two partial images of a 3D image onto the projection surface so that the partial images are superimposed, and only one of the two images is recognizable for each eye of an observer, is known from stereogram projection (stereoscopic projection, 3D projection), whereby a spatial impression of the 3D image results for the observer because of the stereoscopic effect. Different technologies are known for separating the two partial images, which is also called channel separation.

In polarization filter technology, channel separation is achieved using polarized light. For example, polarizing filter films which are each offset by 90° are located in front of the lenses of a projector. Two projectors are also used for this purpose in cinemas. An observer observes the display through polarization spectacles, which have polarizing filters for separating the partial images superimposed on one another. The polarizing filters of the polarization spectacles are adapted to the polarizing filter films on the lenses of the projector or projectors. A metallically-coated projection screen is required to maintain the polarization status of the light. A normal white projection screen would scatter the light again and the channel separation would be canceled out. Disadvantages are, on the one hand, the light loss due to the filters used and the metallic projection screen and, on the other hand, the fact that if linearly polarized light is used, the head must be held straight during the image observation. If the head is held inclined, the angle of 90°, which is required for the channel separation, between the films in front of the projection lenses and the filters in the filter spectacles changes. A channel separation is thus no longer provided, whereby "ghost images" appear to the observer. This disadvantage can be avoided by using circularly polarized light.

In the Dolby 3D projection method, the partial images of the 3D image are projected with the aid of a broadband light source, wherein the splitting of the 3D image content into two partial images is performed via the splitting of the emitted light spectrum or wavelength spectrum into two spectrally independent color spaces. For this purpose, for example, a color filter is moved frame-by-frame from a first position to a second position. The first position spans a different color space in comparison to the second position. The central wavelengths of the two color spaces do not overlap. For example, a green, red, and/or blue partial image composed of lower (color space A) and higher (color space B) wavelengths is projected alternately, for example, at a frequency of 144 Hz. Alternatively, two projectors, which are equipped with filters which generate the two spectrally independent color spaces, can be used in simultaneous operation. The separation of the image channels and the partial images at the human eye of the observer occurs via filter spectacles having color filters and/or interference filters.

U.S. Pat. No. 6,283,597 B1 discloses a 3D projector, which has two RGB projectors. The two RGB projectors display different images of a 3D image using two different color spaces on a projection surface. Each of the two RGB projectors has multiple optical elements for beam guiding and beam bundling, for example, lenses, prisms, and/or mirrors.

DE 10 2008 063 634 A1 discloses a projector for displaying 2D images, in which the 2D images are projected with the aid of a rapidly moving laser beam spot by spot, line by line so rapidly onto a projection surface that an observer sees the 2D images or films consisting of the 2D images on the projection surface. The projector is also referred to as a flying spot projector.

SUMMARY

In various embodiments, a method and a projector for simultaneously projecting two images onto a projection surface are provided, in which the two images are displayed superimposed on one another on the projection surface, so that a first of the two images is recognizable for a first observer and a second of the two images is recognizable for a second observer, wherein the second image is not recognizable for the first observer and the first image is not recognizable for the second observer, if the observers use suitable filter spectacles as described hereafter.

In various embodiments, a method for simultaneously projecting two images onto a projection surface is provided. A first illumination beam is generated in dependence on first image data, which are representative of a first image. The first illumination beam has electromagnetic radiation having a predefined first property. A second illumination beam is generated in dependence on second image data, which are representative of a second image. The second illumination beam has electromagnetic radiation having a predefined second property, which differs from the first property. The first and second illumination beams are deflected toward the projection surface so that the first illumination beam generates a first beam spot on the projection surface and the second illumination beam generates a second beam spot on the projection surface. In this case, the first beam spot is moved over the projection surface so that with the aid of the first beam spot, the first image is displayed for a first observer on the projection surface, and the second beam spot is moved over the projection surface so that with the aid of the second beam spot, the second image is displayed for a second observer on the projection surface, superimposed on the first image.

The two images each show a two-dimensional image, wherein both images can be displayed simultaneously on the entire and/or the same projection surface. The first image is recognizable for the first observer and not for the second observer, and the second image is recognizable for the second observer and not for the first observer, if the observers use suitable filter spectacles as explained hereafter. The first image can be, for example, part of a first series of first images, which are projected successively on the projection surface. The first series of first images can be, for example, a first film or a first computer animation. The second image can be, for example, part of a second series of second images, which are projected successively on the projection surface. The second series of second images can be, for example, a second film or a second computer animation. The two beam spots are guided over the projection surface by deflecting the illumination beams. The two beam spots are guided line-by-line and/or meandering over the projection surface, for example, whereby the two images are displayed simultaneously superimposed on one another.

The use of the two illumination beams for displaying the two images enables the same optics and/or the same optical elements to be used at least partially for the deflection and/or guiding of the two illumination beams. This allows a corresponding projector to be implemented compactly, simply, and/or cost-effectively. For example, the projector can be implemented so compactly that it is easily portable and/or, for example, can be integrated into a portable device, for example, into a mobile telephone, a pager, or a mobile games console.

The separation of the two displayed images is performed on the part of the two observers via suitable filter spectacles. First filter spectacles for the first observer have a first optical filter, which transmits the light of the first image and/or the light having the first property, so that the first image is recognizable for the first observer wearing the first filter spectacles. Simultaneously, the first filter spectacles filter out the light having the second property, so that the second image is not recognizable for the first observer wearing the first filter spectacles. Second filter spectacles for the second observer have a second optical filter, which transmits the light of the second image and/or the light having the second property, so that the second image is recognizable for the second observer wearing the second filter spectacles. The second filter spectacles simultaneously filter out the light having the first property, so that the first image is not recognizable for the second observer wearing the second filter spectacles. In this manner, both observers can simultaneously see different images and/or image contents on the same projection surface. For example, the two observers can simultaneously see different films and/or play a computer game from different perspectives on the same projection surface.

In various embodiments, colored (i.e., multichromic) light of a first color space can be used as the electromagnetic radiation having the predefined first property and colored (i.e., multichromic) light of a second color space can be used as the electromagnetic radiation having the predefined second property, wherein the two color spaces are different. In other words, the predefined property is representative of the color space used, for example. For example, the same or nearly the same colors can be displayed using both color spaces (metamerism). For example, the same white spot can be displayed using both color spaces. For example, each of the color spaces has green, red, and blue light or each of the color spaces has amber-colored and dark-blue light, for example, wherein the wavelengths of the colors of the first color space are shifted within a color in relation to the wavelengths of the colors of the second color space. For example, the same colors of different color spaces have central wavelengths shifted with respect to one another and/or intensity maxima at different wavelengths. The fact that two colors are the same does not necessarily mean in this context that the corresponding light has the same wavelengths, but rather only that the corresponding light awakens the same color impression in an observer. The separation of the two images by using different color spaces during the simultaneous display of both images allows a projection surface to be used which is not polarity-maintaining, for example, as is necessary during stereogram projection using projection filter technology. For example, a simple projection screen and/or wall can then be used as the projection surface. If electromagnetic radiation in the nonvisible range is used, the color spaces can also be referred to as wavelength spaces.

In various embodiments, the first and the second color spaces are selected so that the same white spot is displayable using both color spaces. This can contribute to both observers receiving the impression of seeing colors of the same color space, or one of the observers still having the same color impression upon changing the filter spectacles.

In various embodiments, electromagnetic radiation having a first polarization is used as electromagnetic radiation having the predefined first property and electromagnetic radiation having a second polarization is used as electromagnetic radiation having the predefined second property, wherein the first polarization differs from the second polarization. The first filter spectacles are then implemented so that they transmit light having the first polarization for the first observer and filter out light having the second polarization. The second filter spectacles are then implemented so that they transmit light having the second polarization for the second observer and filter out light having the first polarization.

The separation of the images for the first and the second observers with the aid of different polarization of the two images can be performed additionally or alternatively to the separation of the images via different color spaces. The first property is then representative of the first color space and the first polarization and the second property is then representative of the second color space and the second polarization. If the separation via the polarization is performed in addition to the separation via the color spaces, a selectivity of the images can thus be improved. In other words, the color spaces used can overlap and/or the central wavelengths can be closer to one another than in the case of separation of the images exclusively via the color spaces. This can contribute to particularly good color display. The first filter spectacles are then implemented so that, for the first observer, they transmit light of the first color space and having the first polarization and filter out light of the second color space and the second polarization. The second filter spectacles are then implemented so that, for the second observer, they transmit light of the second color space and the second polarization and filter out light of the first color space and the first polarization. Furthermore, the first and the second properties of the light can relate to further properties of the light, which allow a separation of the two images.

If the separation of the images is performed exclusively via the polarization, the property of the light thus specifies the type of the polarization. If the separation of the images is performed exclusively via the color spaces, the property of the light thus specifies the wavelength ranges of the color spaces. If the separation of the images is performed via the color spaces and the polarization, the property of the light thus specifies the wavelength ranges of the color spaces and the polarization of the light.

In various embodiments, the two beam spots are projected superimposed on one another on the projection surface. This contributes to the same optics or at least partially the same optical elements being able to be used for both illumination beams. This can contribute to a compact and/or cost-effective construction of the projector. The fact that the two beam spots are superimposed on one another means, for example, that the two beam spots are located simultaneously on the same surface area of the projection surface.

In various embodiments, during the display of the first and the second images on the projection surface, a third image is displayed for a third observer. For this purpose, a third illumination beam is generated in dependence on third image data, which are representative of the third image. The third illumination beam has electromagnetic radiation having a predefined third property, which differs from the first and second properties. The third illumination beam is deflected toward the projection surface so that the third illumination beam generates a third beam spot on the projection surface. The third beam spot is moved over the projection surface so that with the aid of the third beam spot, the third image is displayed on the projection surface superimposed on the first and the second images.

In other words, with the aid of the third illumination beam, the third image is displayed, which can be observed by the third observer, while the first observer observes the first image and the second observer observes the second image, wherein the first and the second images are not recognizable for the third observer, if the third observer uses suitable third filter spectacles. In this manner, three different image contents for three observers can be displayed simultaneously on the same projection surface. For example, three observers can simultaneously see three different films or play a computer game simultaneously from three different perspectives on the same projection surface, wherein all observers have the entire projection surface available for their image.

The third property of the third illumination beam can relate, corresponding to the first and second properties, to the color space used and therefore to the wavelengths of the electromagnetic radiation used and/or to the polarization of the electromagnetic radiation used. In addition, further images for further observers can be displayed simultaneously on the same (entire) projection surface using further illumination beams.

The separation of the third image from the first and the second images is performed on the part of the third observer via the third filter spectacles, which have a third optical filter, which transmits the light of the third image and/or the light having the third property and simultaneously filters out the light having the first and the second properties.

In various embodiments, a projector for simultaneously projecting the first and the second images onto the projection surface has a first illumination arrangement, which generates the first illumination beam in dependence on the first image data. The first illumination beam has electromagnetic radiation having the predefined first property. A second illumination arrangement generates the second illumination beam in dependence on second image data, which are representative of the second image. The second illumination beam has electromagnetic radiation having the predefined second property, which differs from the first property. A deflection device deflects the first and the second illumination beams toward the projection surface so that with the aid of the first illumination beam, the first image is displayed for the first observer, and with the aid of the second illumination beam, the second image is displayed for the second observer, superimposed on the first image on the projection surface.

In various embodiments, the first illumination arrangement is implemented, for example, so that it generates the electromagnetic radiation of the first color space, and the second illumination arrangement is implemented so that it generates the electromagnetic radiation of the second color space, which differs from the first color space.

In various embodiments, the first illumination arrangement has: a first radiation source, which is implemented so that it generates electromagnetic radiation of a first wavelength range, a second radiation source, which is implemented so that it generates electromagnetic radiation of a second wavelength range, a third radiation source, which is implemented so that it generates electromagnetic radiation of a third wavelength range. The electromagnetic radiation of the first, second, and third wavelengths spans the first color space, for example. The second illumination arrangement has: a fourth radiation source, which is implemented so that it generates electromagnetic radiation of a fourth wavelength range, a fifth radiation source, which is implemented so that it generates electromagnetic radiation of a fifth wavelength range, and a sixth radiation source, which is implemented so that it generates electromagnetic radiation of a sixth wavelength range, wherein the electromagnetic radiation of the fourth, fifth, and sixth wavelength ranges spans the second color space, for example.

Alternatively thereto, the first illumination arrangement can only have the first and the second radiation sources and the second illumination arrangement can only have the fourth and the fifth radiation sources. The electromagnetic radiation of the first wavelength range emitted by the first radiation source and the electromagnetic radiation of the second wavelength range emitted by the second radiation source then span the first color space and the electromagnetic radiation of the fourth wavelength range emitted by the fourth radiation source and the electromagnetic radiation of the fifth wavelength range emitted by the fifth radiation source then span the second color space.

Alternatively thereto, in each case two radiation sources of an illumination arrangement can emit electromagnetic radiation of the same color, so that using an illumination arrangement having three radiation sources, electromagnetic radiation of two wavelength ranges and therefore one color space can be generated.

The individual wavelength ranges can be relatively narrow or relatively broad in dependence on the radiation source used. For example, the wavelength ranges can be between 1 and 10 nm wide. The wavelength ranges have in each case a central wavelength, which is approximately in the middle of the respective wavelength range, for example. The different wavelength ranges, for example, two wavelength ranges of the same color but different color spaces, can overlap one another, wherein in each case the central wavelengths must have sufficient spacing from one another. The sufficient spacing is dependent on the selectivity of the filter spectacles used. For example, if the selectivity of the filter spectacles is 5 nm, different central wavelengths of the same color should thus have more than a 5 nm spacing from one another.

The fact that light has the same color means in this application that the light leaves the same or an at least similar color impression with an observer. Light of the same color is in this context, for example, green, red, or blue or a mixture of these colors. Each individual color can be displayed with the aid of light of different wavelengths and/or from different wavelength ranges. For example, light of the first and fourth wavelength ranges appears red, light of the second and fifth wavelength ranges appears green, and light of the third and the sixth wavelength ranges appears blue to the observer.

In various embodiments, the first illumination arrangement generates electromagnetic radiation of the first polarization and the second illumination arrangement generates electromagnetic radiation of the second polarization, which differs from the first polarization.

For example, the first illumination arrangement has a first polarization filter for polarizing the electromagnetic radiation according to the first polarization and the second illumination arrangement has a second polarization filter for polarizing the electromagnetic radiation according to the second polarization.

In various embodiments, the deflection device has a first deflection unit for deflecting the first illumination beam and a second deflection unit for deflecting the second illumination beam. Alternatively thereto, both illumination beams can be deflected with the aid of the same deflection unit toward the projection surface. The deflection unit can have, for example, one or more mirrors, for example, a micro-mirror array.

In various embodiments, in one wavelength spectrum, in each case one of the wavelength ranges of the first color space is adjacent to one of the wavelength ranges of the second color space, wherein the two adjacent wavelength ranges each represent electromagnetic radiation of the same color. The radiation sources which generate the electromagnetic radiation of the corresponding adjacent wavelength ranges are arranged adjacent to one another. For example, the first and the fourth radiation sources generate red light, the second and the fifth radiation sources generate green light, and the third and the sixth radiation sources generate blue light. Then, for example, the first and the fourth radiation sources, the second and the fifth radiation sources, and the third and the sixth radiation sources are each arranged adjacent to one another. For example, these pairs of radiation sources are arranged so close to one another that at least partially the same optics and/or the same optical elements can be used for guiding, polarizing, filtering, and/or deflecting the corresponding identically-colored illumination beams.

In various embodiments, multiple optical elements are arranged for deflecting and/or guiding the illumination beams to the deflection device. The optical elements are implemented and arranged so that the illumination beams of two adjacent radiation sources are deflected and/or guided via the same optical elements to the deflection device. This can contribute to precise display of the first and/or second image and/or to a simple, compact, and/or cost-effective construction of the projector.

In various embodiments, the projector for simultaneously projecting the third image onto the projection surface for the third observer during the projection of the first and the second images on the projection surface has a third illumination arrangement, which generates the third illumination beam in dependence on the third image data, which are representative of the third image. The third illumination beam has electromagnetic radiation having the predefined third property, which differs from the first and the second properties. The deflection device deflects the third illumination beam toward the projection surface so that with the aid of the third illumination beam, the third image is displayed for the third observer superimposed on the first and the second images on the projection surface.

A projection system can have the projector and the first and the second filter spectacles. The first filter spectacles are implemented so that they transmit electromagnetic radiation having the first property and filter out electromagnetic radiation having the second property. The second filter spectacles are implemented so that they transmit electromagnetic radiation having the second property and filter out electromagnetic radiation having the first property.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 9 shows a flow chart of an embodiment of a method for simultaneously displaying two images on a projection surface; and FIG. 10 shows an embodiment of a projector for simultaneously displaying three images on a projection surface.

DETAILED DESCRIPTION

The following detailed description refers to the accompanying drawing that show, by way of illustration, specific details and embodiments in which the disclosure may be practiced.

In the following detailed description, reference is made to the appended drawings, which form a part of this disclosure and in which specific embodiments, in which the disclosure can be implemented, are shown for illustration. In this regard, direction terminology such as "top", "bottom", "forward", "back", "front", "rear", etc. is used with reference to the orientation of the described figure(s). Since components of embodiments can be positioned in a number of different orientations, the direction terminology is used for illustration and is in no way restrictive. It is obvious that other embodiments can be used and structural or logical changes can be performed without deviating from the scope of protection of the present disclosure. It is obvious that the features of the different embodiments described herein can be combined with one another, if not specifically indicated otherwise. The following detailed description is therefore not to be interpreted in a restrictive sense, and the scope of protection of the present disclosure is defined by the appended claims.

In the scope of this description, the terms "connected", "attached", and also "coupled" are used to describe both a direct and also an indirect connection, a direct or indirect attachment, and also a direct or indirect coupling. In the figures, identical or similar elements are provided with identical reference signs, insofar as this is expedient.

Figure 1:
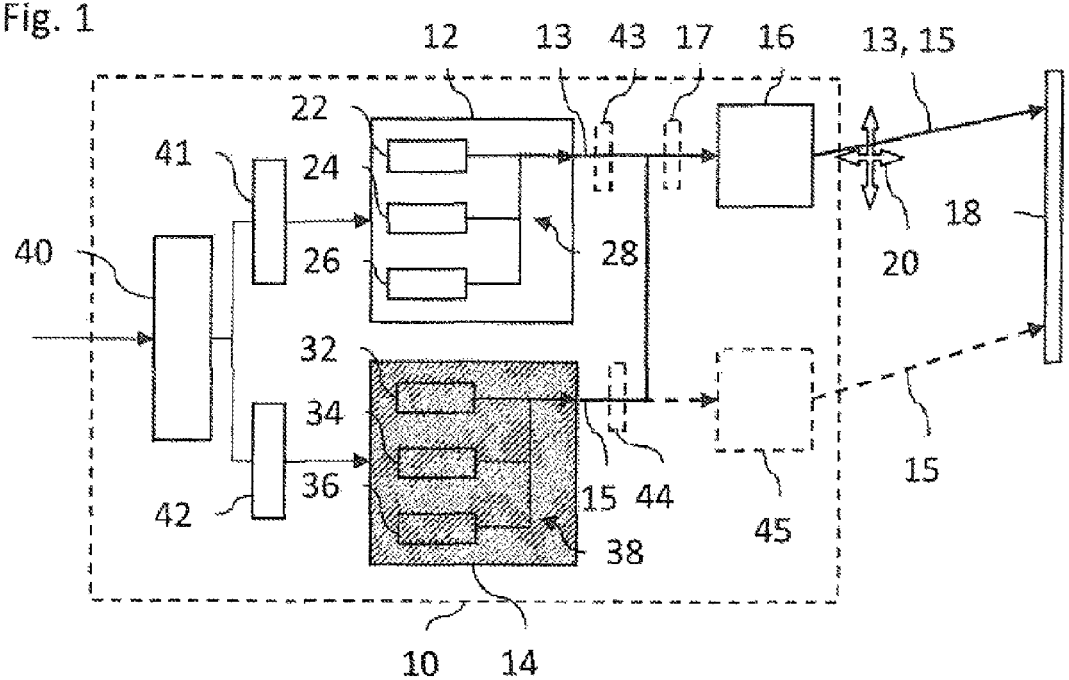
FIG. 1 shows an embodiment of a projector for simultaneously displaying two images on a projection surface.

FIG. 1 shows a first embodiment of a projector 10 for displaying two images 90, 92 (see FIG. 5) on a projection surface 18, wherein the two images 90, 92 can have different image contents. The projector 10 can also be referred to as a flying spot projector. The projector 10 has a first illumination arrangement 12 and a second illumination arrangement 14. The first illumination arrangement 12 generates a first illumination beam 13 and the second illumination arrangement 14 generates a second illumination beam 15. The first illumination arrangement 12 has a first radiation source 22, a second radiation source 24, and a third radiation source 26. The first, second, and third radiation sources 22, 24, 26 each generate a first partial beam 28. The first partial beams together form the first illumination beam 13. The second illumination arrangement 14 has a fourth radiation source 32, a fifth radiation source 34, and a sixth radiation source 36. The fourth, fifth, and sixth radiation sources 32, 34, 36 each generate a second partial beam 38, which together form the second illumination beam 15. The first and second partial beams 28, 38 each have, for example, light of three primary colors, with the aid of which an independent color space can be displayed in each case. For example, the first and second partial beams 28, 38 each have red, green, and blue light. The illumination arrangements 12, 14 can also be referred to as clusters, for example, as RGB clusters.

Alternatively thereto, the first illumination arrangement 12 can only have the first and the second radiation sources 22, 24 and the second illumination arrangement 14 can only have the fourth and the fifth radiation sources 32, 34. The first and second partial beams 28, 38 then each have amber-colored and dark-blue light, for example.

The two illumination beams 13, 15 are deflected toward a deflection device, which has at least one first deflection unit 16. For example, the first deflection unit 16 has a micromirror arrangement (MEMS) and/or a micro-mirror actuator. Multiple optical elements (not shown in FIG. 1), for example, lenses, prisms, and mirrors, are provided for deflecting and/or guiding the partial beams 28, 38 and/or the illumination beams 13, 15 toward the deflection device. The beam guiding can be performed in this case, for example, via angle coupling and/or by beam unification by means of combination prisms, wherein spectrally different light components can be coupled in with combination prisms.

The first deflection unit 16 is used for the purpose of guiding the illumination beams 13, 15 over the projection surface 18 so that with the aid of the first illumination beam 13, a first image 90 (see FIG. 5) can be displayed for a first observer and with the aid of the second illumination beam 15, a second image 92 can be displayed for a second observer, superimposed on one another on the projection surface 18. For this purpose, the deflection device deflects the illumination beams 13, 15, for example, corresponding to a direction cross 20, upward, downward, right, and left on the projection surface 18. Alternatively or additionally to the first deflection unit 16, the deflection device can have a second deflection unit 45. The second deflection unit 45 can be used, for example, for the purpose of deflecting the first and/or the second illumination beam 13, 15 toward the projection surface 18 additionally or alternatively to the first deflection unit 16.

Image data which represent the first and/or second image 90, 92 can be supplied via a video processor 40 into the projector 10. For example, first image data represent the first image 90 for the first observer and second image data represent the second image 92 for the second observer. The video processor 40 processes the supplied image data and relays the processed first image data to a first activation unit 41, which controls the first illumination arrangement 12, and relays the processed second image data to a second activation unit 42, which controls the second illumination arrangement 14. The illumination arrangements 12, 14 generate the partial beams 28, 38 in dependence on the first and second image data.

Optionally, a first polarization filter 43 and/or a second polarization filter 44 is/are provided. The first polarization filter 43 is used, for example, for the purpose of polarizing the first illumination beam 13, for example, polarizing it circularly or linearly. The second polarization filter 44 is used, for example, for the purpose of polarizing the second illumination beam 15, for example, polarizing it circularly or linearly, wherein the polarization of the second illumination beam 15 differs from a polarization of the first illumination beam 13.

Figure 2:
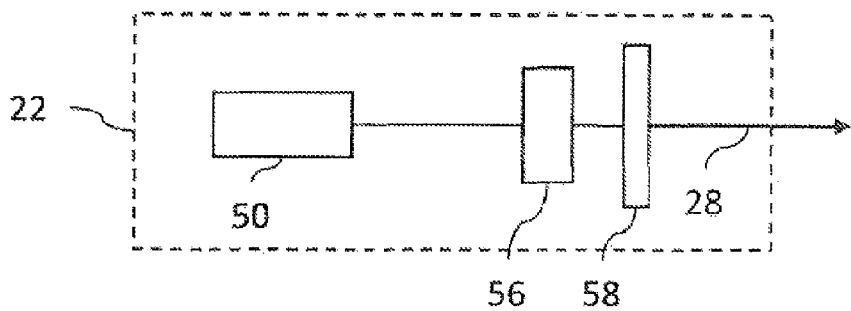
FIG. 2 shows an embodiment of a radiation source.

FIG. 2 shows an embodiment of one of the radiation sources 22, 24, 26, 32, 34, 36 of the illumination arrangements 12, 14, for example, the radiation source 22. The radiation source 22 has a first laser unit 50. The first laser unit 50 has, for example, a laser diode, which generates monochromatic radiation or monochromatic light, for example. For example, the first laser unit 50 generates green laser light. The green laser light, for example, passes through a collimation lens 56 and subsequently through an optional filter 58, which is a color and/or polarization filter, for example. Alternatively, another radiation source can also be used. The further radiation sources 24, 26, 32, 34, 36 can be implemented according to the first radiation source 22, for example. The filter 58 can be arranged alternatively or additionally to the first and/or second polarization filter 43, 44.

Figure 3:
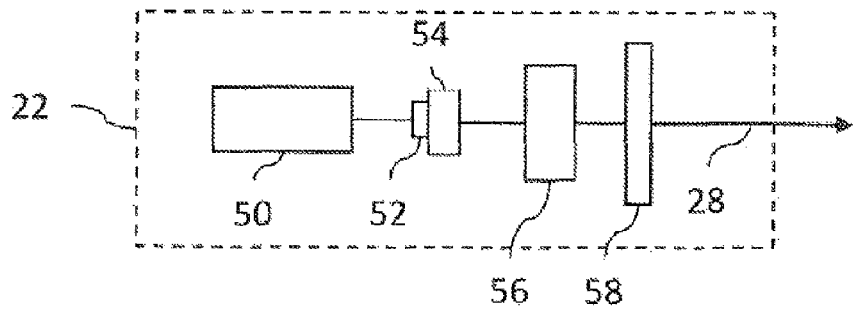
FIG. 3 shows a further embodiment of a radiation source.

FIG. 3 shows an alternative embodiment of one of the radiation sources 22, 24, 26, 32, 34, 36 of the illumination arrangements 12, 14, for example, the first radiation source 22. The first radiation source 22 has the first laser unit 50. The first laser unit 50 is used in this embodiment, for example, as a pump light source and is oriented onto a first conversion element 52. The first laser unit 50 can emit pulsed or continuous excitation light. The first laser unit 50 has a laser diode, for example. The first conversion element 52 is held by a transparent carrier 54. The first conversion element has phosphors and/or a phosphor mixture, which can be excited to phosphorescence with the aid of the laser light of the first laser unit 50, which can also be referred to in this context as excitation radiation, wherein the first conversion element 52 converts the excitation radiation into conversion radiation. The wavelengths of the excitation radiation are converted during the conversion. For example, during an up-conversion, the wavelengths of the excitation radiation are converted into shorter wavelengths, wherein the conversion radiation then has the shorter wavelengths. Alternatively thereto, during a down-conversion, the wavelengths of the excitation radiation are converted into longer wavelengths, wherein the conversion radiation then has the longer wavelengths.

The phosphors have fluorescent and/or phosphorescent substances, for example. The phosphors have, for example, for generating red light, for example, calsin (CaAlSiN3:Eu), for generating green light, for example, green-emitting phosphor, for example, cerium-doped YAG (Ba0.40Eu0.60Mn0.30)MgAl10O17, and/or for generating yellow light, for example, YAG:Ce (Y0.96Ce0.04)3Al3.75Ga1.25O12. For example, the first laser unit 50 generates blue laser light, which excites green-phosphorescent phosphors to phosphorescence in the conversion element 52, whereby green conversion light is generated. The green conversion light passes through the first carrier 54 and subsequently through the collimation lens 56 and the optional filter 58, which is, for example, a color and/or polarization filter. The first radiation source 22 can be referred to as a LARP (laser activated remote phosphor) radiation source. Alternatively, another radiation source can also be used. The further radiation sources 24, 26, 32, 34, 36 can be implemented according to the first radiation source 22, for example.

Figure 4:
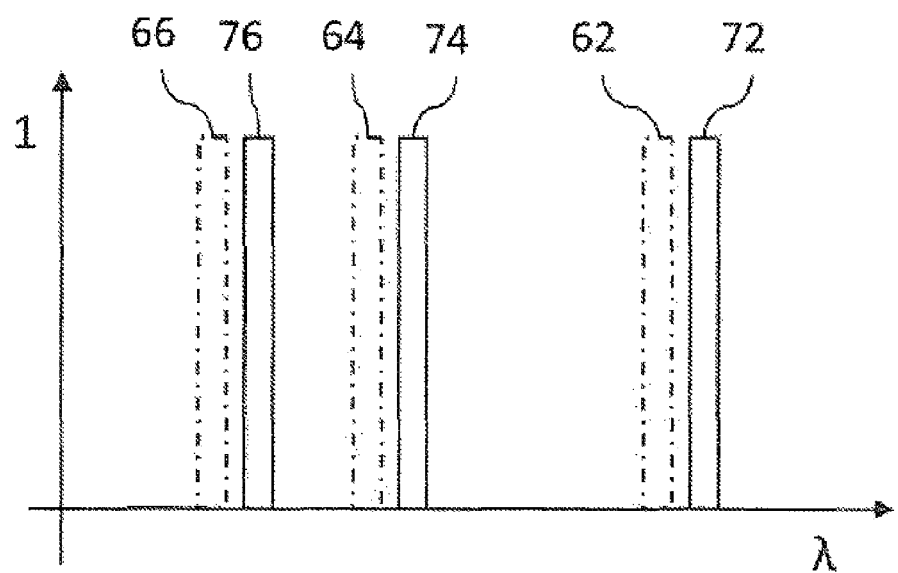
FIG. 4 shows an embodiment of two different color spaces.

FIG. 4 shows a wavelength diagram, in which two different color spaces are shown. A first color space has a first wavelength range 62, a second wavelength range 64, and a third wavelength range 66. A second color space, which differs from the first color space, has a fourth wavelength range 72, a fifth wavelength range 74, and a sixth wavelength range 76. Light of the wavelengths from the first and fourth wavelength ranges 62, 72 is perceived as red light, for example, by an observer. Light of the wavelengths from the second and fifth wavelength ranges 64, 74 is perceived as green light, for example, by an observer. Light of the wavelengths from the third and sixth wavelength ranges 66, 76 is perceived as blue light, for example, by an observer. Each of the two color spaces can be referred to by itself as an RGB color space. For example, both color spaces are selected so that the same white spot is displayable using them in a projection.

For example, the first wavelength range 62 has wavelengths between 635 and 645 nm. For example, the second wavelength range 64 has wavelengths between 510 and 520 nm. For example, the third wavelength range 66 has wavelengths between 440 and 450 nm. For example, the fourth wavelength range 72 has wavelengths between 650 and 660 nm. For example, the fifth wavelength range 74 has wavelengths between 525 and 535 nm. For example, the sixth wavelength range 76 has wavelengths between 455 and 465 nm. Each of the wavelength ranges has a central wavelength, which is, for example, approximately in the middle of the corresponding wavelength range. Two different wavelength ranges of the same color have a predefined spacing to one another, for example. The predefined spacing can be selected, for example, in dependence on a selectivity of filter spectacles to be used. For example, if the filter spectacles have a selectivity of 5 nm, the predefined spacing is, for example, greater than or equal to 5 nm. Multiple wavelengths (longitudinal modes) can occur within each of the wavelength ranges.

For example, the first radiation source 22 generates light having wavelengths from the first wavelength range 62, the second radiation source 24 generates electromagnetic radiation having wavelengths from the second wavelength range 64, the third radiation source 26 generates electromagnetic radiation having wavelengths from the third wavelength range 66, the fourth radiation source 32 generates electromagnetic radiation having wavelengths from the fourth wavelength range 72, the fifth radiation source 34 generates electromagnetic radiation having wavelengths from the fifth wavelength range 74, and the sixth radiation source 36 generates electromagnetic radiation having wavelengths from the sixth wavelength range 76. Therefore, the radiation sources 22, 24, 26 of the first illumination arrangement 12 generate electromagnetic radiation having wavelengths from the first color space and the radiation sources 32, 34, 36 of the second illumination arrangement 14 generate electromagnetic radiation having wavelengths from the second color space. In other words, first electromagnetic radiation of the first illumination arrangement 12 spans the first color space and second electromagnetic radiation of the second illumination arrangement 14 spans the second color space. With the aid of the first electromagnetic radiation, the first image 90 can be displayed for the first observer on the projection surface 18 and with the aid of the second electromagnetic radiation, the second image 92 can be displayed for the second observer on the projection surface 18, wherein the second image 92 is superimposed on the first image 90, as explained in greater detail hereafter with reference to FIG. 5. The radiation sources preferably generate electromagnetic radiation in the corresponding wavelength ranges in the case of all typically occurring conditions, for example, at temperatures between 10 and 70° C. If necessary, the radiation sources can be readjusted in dependence on the ambient temperature, to thus generate a substantially constant emission wavelength.

Alternatively or additionally to the separation of the images 90, 92 for the first observer and the second observer with the aid of different color spaces, the separation of the images can also be achieved with differently polarized illumination beams 13, 15. For example, the light of the first, second, and third wavelength ranges 62, 64, 66 has a first polarization and the light of the fourth, fifth, and sixth wavelength ranges 72, 74, has a second polarization. For example, the first illumination beam 13 can be polarized with the aid of the first polarization filter 43 according to a first polarization and the second illumination beam 15 can be polarized with the aid of the second polarization filter 44 according to a second polarization. For example, the two illumination beams 13, 15 can be linearly polarized, wherein the polarization of the second illumination beam 15 is orthogonal to the polarization of the first illumination beam 13, for example. Alternatively thereto, the illumination beams 13, 15 can be circularly polarized. For example, the first illumination beam 13 can be left-circularly polarized with the aid of the first polarization filter 43 and the second illumination beam 15 can be right-circularly polarized with the aid of the second polarization filter 44.

The separation of the two images 90, 92 for the two observers is performed on the part of the two observers with the aid of the filter spectacles. First filter spectacles for the first observer have a different optical filter than second filter spectacles for the second observer. In dependence on the type of the display of the images, the filter spectacles can have color and/or polarization filters. For example, the separation of the two images 90, 92 is performed on the part of the first observer via the first filter spectacles and on the part of the second observer via the second filter spectacles. For example, the first filter spectacles for the first observer transmit light of the first color space and/or the first polarization and filter out light of the second color space and/or the second polarization. For example, the second filter spectacles for the second observer transmit light of the second color space and/or the second polarization and filter out light of the first color space and/or the first polarization. For this purpose, the first filter spectacles used by the first observer have a first optical filter, which transmits electromagnetic radiation of the first color space and/or the first polarization and filters out electromagnetic radiation of the second color space and/or the second polarization. While in contrast the second filter spectacles used by the second observer have a second optical filter, which transmits electromagnetic radiation of the second color space and/or the second polarization and filters out electromagnetic radiation of the first color space and/or the first polarization. In this manner, the first observer sees exclusively the first image on the projection surface and the second observer simultaneously sees exclusively the second image on the same projection surface.

The projector and the filter spectacles together form a projection system for simultaneously displaying two images on a projection surface. The color space of the electromagnetic radiation and/or the polarization of the electromagnetic radiation are properties of the electromagnetic radiation. For example, the first color space and/or the first polarization are a first property of the electromagnetic radiation and the second color space and/or the second polarization are a second property of the electromagnetic radiation.

Figure 5:
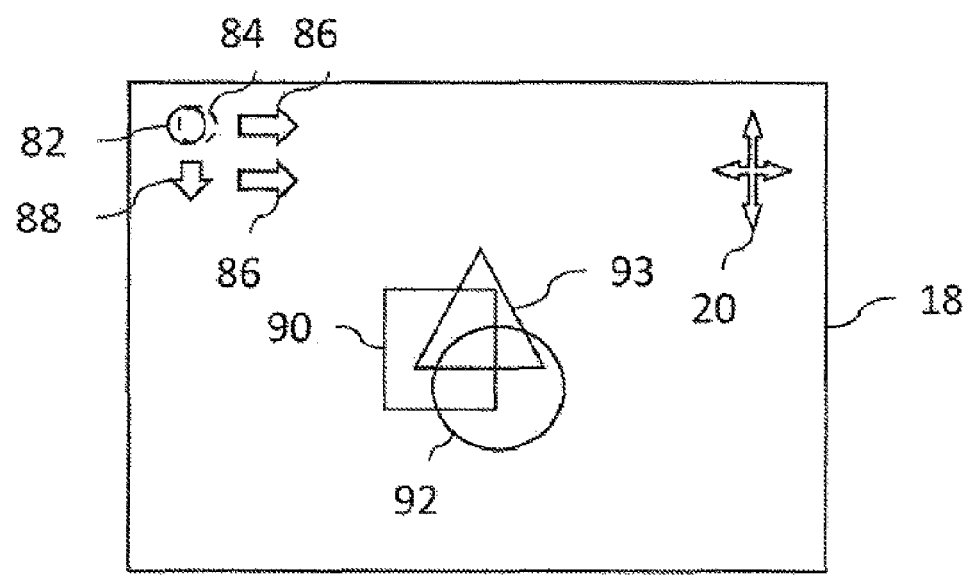
FIG. 5 shows an embodiment of a projection surface.

FIG. 5 shows a top view of the projection surface 18. The first illumination beam 13 generates a first beam spot 82 on the projection surface 18 and the second illumination beam 15 generates a second beam spot 84 on the projection surface 18. The two beam spots 82, 84 are shown adjacent to one another for the illustration in FIG. 5; however, they can lie temporarily or permanently one on top of another, for example, can be congruent, and/or can be superimposed in operation of the projector 10. The two beam spots 82, 84 are moved in normal operation of the projector 10 sufficiently rapidly over the projection surface 18 that they are no longer recognizable for the observers as individual beam spots 82, 84, but rather as images and/or films. For example, the two beam spots 82, 84 are moved over the projection surface 18 along a first direction 86 and along a second direction 88, which is perpendicular to the first direction 86. In other words, for example, the projection surface 18 is scanned line-by-line by the beam spots 82, 84.

The color at which the two beam spots 82, 84 appear on the projection surface 18 can be set by controlling the mixture of the partial beams 28, 38. For example, the color of the first beam spot 82 can be set by a mixture of the first partial beams and a color of the second beam spot 84 can be set by a mixture of the second partial beams 38. If the first beam spot is to appear exclusively red, for example, the second and third radiation sources 24, 26 can thus be turned off or the corresponding first partial beam 28 can be shaded, for example. In contrast thereto, if the first beam spot 82 is to appear white, for example, this can thus be achieved, for example, by a uniform mixture of the first partial beams 28 of the first, second, and third radiation sources 22, 24, 26. The color setting of the second beam spot 84 can accordingly be performed via the activation of the second illumination arrangement 14.

For example, the first beam spot 82 has light of the first color space and/or light which is polarized according to the first polarization, and the second beam spot 82 has light of the second color space and/or light which is polarized according to the second polarization. With the aid of the first beam spot 82, the first image 90 is generated for the first observer on the projection surface 18 and during this, the second image 92 is generated with the aid of the second beam spot 84 for the second observer on the same projection surface 18, wherein the two images 90, 92 are superimposed and in each case both images 90, 92 extend over the entire projection surface 18, for example.

In the case of differently polarized electromagnetic radiation, the same color space can be used for both beam spots 82, 84 or two different color spaces can be used. For example, the separation of the two images 90, 92 can fundamentally be achieved via different color spaces, wherein a selectivity of the images 90, 92 can additionally be achieved with the aid of the different polarization of the light of the corresponding images 90, 92.

If the separation of the images 90, 92 is performed via the polarization, the projection surface 18 is to be implemented as polarity-maintaining. For example, the projection surface 18 can have a metal coating, for example, a silver layer. If the separation of the images is performed exclusively via the different color spaces, a simple, for example, white projection screen or wall can be used as the projection surface 18.

Additionally to the first illumination arrangement 12 and the second illumination arrangement 14, one, two, or more further illumination arrangements can also be provided, with the aid of which, for example, a third image 93 can be displayed for a third observer on the projection surface 18 during the display of the first and second images 90, 92 for the first and the second observer, respectively, as explained in greater detail hereafter with reference to FIG. 10. The third image 93 can then display a different image content than the first and/or the second image 90, 92.

Figure 6:
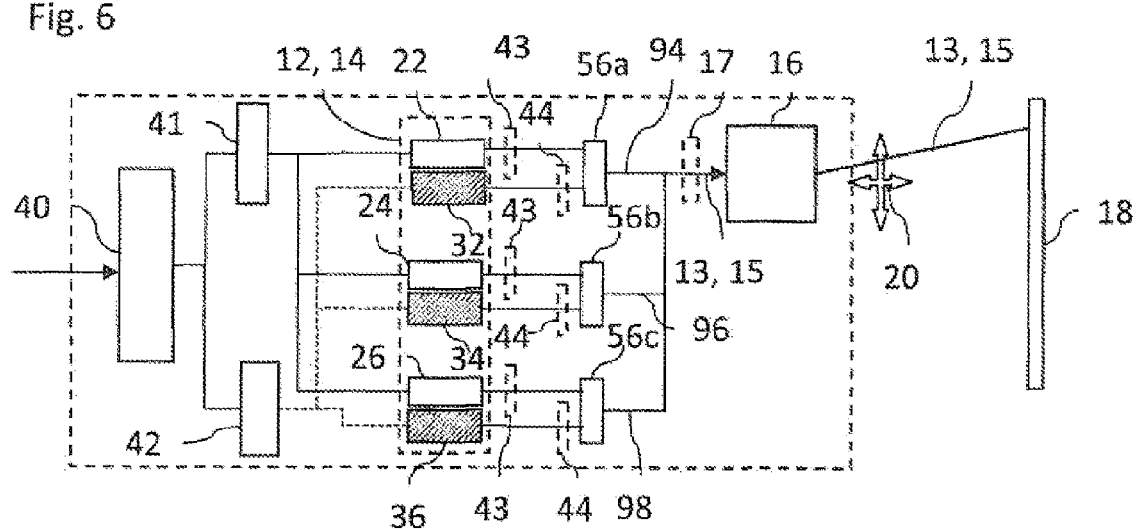
FIG. 6 shows a further embodiment of a projector for simultaneously displaying two images on a projection surface.

FIG. 6 shows a further embodiment of the projector 10. The elements of the projector 10 of this embodiment substantially correspond to the elements of the embodiment of the projector 10 shown in FIG. 1. The essential difference of the two exemplary embodiments is that in the embodiment shown in FIG. 6, no spatial separation of the two illumination arrangements 12, 14 is performed. The radiation sources 22, 24, 26, 32, 34, of the illumination arrangements 12, 14 are arranged in pairs in this embodiment. For example, each two of the radiation sources 22, 24, 26, 32, 34, 36 which generate electromagnetic radiation of the same color are arranged adjacent, for example, directly next to one another. For example, the first and the fourth radiation sources 22, 32, the second and the fifth radiation sources 24, 34, and the third and the sixth radiation sources 26, 36 are arranged directly adjacent to one another.

The first, second, and third radiation sources 22, 24, 26 are each optionally assigned a first polarization filter 43, the mode of operation of which corresponds to that of the above-explained first polarization filter 43, and the fourth, fifth, and sixth radiation sources 32, 34, 36 are each optionally assigned a second polarization filter 44, the mode of operation of which corresponds to that of the above-explained second polarization filter 44. Therefore, the first polarization filters 43 are suitable for polarizing the electromagnetic radiation of the first, second, and third radiation sources 22, 24, 26, for example, according to the first polarization, and the second polarization filters 44 are suitable for polarizing the electromagnetic radiation of the fourth, fifth, and sixth radiation sources 32, 34, 36, for example, according to the second polarization.

The first and the fourth radiation sources 22, 32 are assigned a first collimation lens 56a. The second and the fifth radiation sources 24, 34 are assigned a second collimation lens 56b. The third and the sixth radiation sources 26, 36 are assigned a third collimation lens 56c. The partial beams of the first and the fourth radiation sources 22, 32 are bundled with the aid of the first collimation lens 56a to form, for example, a red partial beam 94. The partial beams of the second and the fifth radiation sources 24, 34 are bundled with the aid of the second collimation lens 56b to form, for example, a green partial beam 96. The partial beams of the third and the sixth radiation sources 26, 36 are bundled with the aid of the third collimation lens 56c to form, for example, a blue partial beam 98. The red, green, and blue partial beams 94, 96, 98 are then deflected toward the deflection device.

Figure 7:
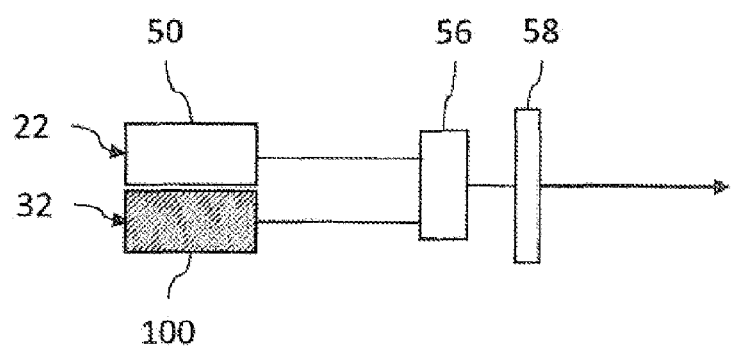
FIG. 7 shows an embodiment of two radiation sources.

FIG. 7 shows an exemplary embodiment of two adjacent radiation sources, for example, the first radiation source 22 and the fourth radiation source 32, of the projector 10 according to FIG. 6. In this embodiment, the fourth radiation source 32 has a second laser unit 100 and a second carrier 104. The first and the fourth radiation sources 22, 32 and/or the first and the second laser units 50, 100 can also be referred to in this context as a package and/or can be arranged on a shared substrate. The further radiation sources 24, 26, 34, 36 can be implemented, for example, according to the first radiation source 22 and the fourth radiation source 32.

The arrangement, implementation, and/or function of the second laser unit 100 can substantially correspond to the arrangement, implementation, and/or function of the first laser unit 50, wherein the wavelengths of the electromagnetic radiation which is generated by the second laser unit 100 are shifted at least slightly in relation to the wavelengths of the electromagnetic radiation which is generated by the first laser unit 50. For example, electromagnetic radiation of the first wavelength range 62 is generated using the first laser unit and electromagnetic radiation of the fourth wavelength range 72 is generated using the second laser unit 100.

Due to the adjacent arrangement of the two radiation sources 22, 32 and/or the two laser units 50, 100, the collimation lens and the polarization filter 58 and also deflection or redirection elements (not shown), for example, dichroic mirrors, can be used jointly for the light of the same color. The adjacent laser units 50, 100 can be arranged on a substrate. The emission points of the laser units 50, 100 can be spaced apart from one another, for example, by less than 100 μm, less than 50 μm, or less than 10 μm. A field of view (FOV) of the downstream optics can then be adapted to this spacing. In the beam direction, a spacing of the laser units 50, 100 to one another, for example, as a result of a manufacturing tolerance, can be less than 5 µm, less than 2 µm, or less than 1 µm. The beam spots 82, 84 can have equal or similar sizes on the projection surface 18 if the laser units 50, 100 have equal or similar divergence angles, for example. For example, the divergence can be less than 5°, for example, less than 2°, or less than 1°, applicable in each case for both axes.

Figure 8:
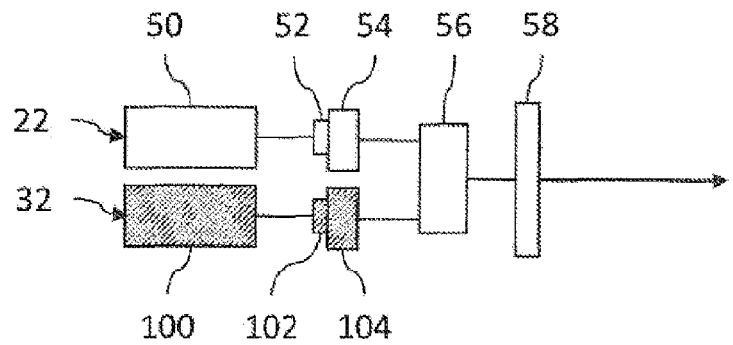
FIG. 8 shows a further embodiment of two radiation sources.

FIG. 8 shows an alternative embodiment of two adjacent radiation sources, for example, the first radiation source 22 and the fourth radiation source 32, of the projector 10 according to FIG. 6. In this embodiment, the fourth radiation source 32 has the second laser unit 100, a second conversion element 102, and a second carrier 104. The first and the fourth radiation sources 22, 32 and/or the first and the second laser units 50, 100 can also be referred to as a package and/or can be arranged on a shared substrate in this context. The first and/or the second radiation source 22, 32 can be referred to as LARP (laser activated remote phosphor) radiation sources. Alternatively, other radiation sources can also be used. The further radiation sources 24, 26, 34, 36 can be implemented, for example, according to the first radiation source 22 and the fourth radiation source 32.

The arrangement, implementation, and/or function of the second laser unit 100, the second conversion element 102, and the second carrier 104 can essentially correspond to the arrangement, implementation, and/or function of the first laser unit 50, the first conversion element 52, and the first carrier 54, respectively, wherein the wavelengths of the conversion light which is generated in the second conversion element 102 are shifted at least slightly in relation to the wavelengths of the conversion light which is generated in the first conversion element 52. For example, conversion light of the first wavelength range 62 is generated in the first conversion element 52 and conversion light of the fourth wavelength range 72 is generated in the second conversion element 102. The partial light beams 94, 96, 98 have the conversion light.

Alternatively thereto, the first laser unit 50 can be assigned to the first conversion element 52 and the second conversion element 102, so that the first laser unit 50 also excites the phosphors in the second conversion element 102 to phosphorescence, and the second laser unit 100 can be omitted. Therefore, the same radiation source can be used to excite the phosphors in the first conversion element 52 as to excite the phosphors in the second conversion element 102. For example, the phosphors of both conversion elements 52, 102 can be excited to phosphorescence with the aid of blue laser light, for example, from the first laser unit 50. In this case, the phosphors of the conversion elements 52, 102 are selected so that they emit the conversion light (emission light) from the corresponding wavelength range after their excitation upon quenching. For example, the first conversion element 52 can emit red conversion light in the first wavelength range 62 and the second conversion element 102 can emit red conversion light in the fourth wavelength range 72.

Furthermore, due to the adjacent arrangement of the two radiation sources 22, 32 and/or of the two laser units 50, 100, the collimation lens 56 and the polarization filter 58 and also deflection or redirection elements (not shown), for example, dichroic mirrors, can be used jointly for the conversion light of the same color. The adjacent laser units 50, 100 and/or the adjacent conversion elements 52, 102 can be arranged on a substrate. The emission points of the laser units 50, 100 and/or the conversion elements 52, 102 can be spaced apart from one another, for example, by less than 100 µm, less than 50 µm, or less than 10 µm. A field of view (FOV) of the downstream optics can then be adapted to this spacing. In the beam direction, a spacing of the laser units to one another, for example, as a result of a manufacturing tolerance, can be less than 5 µm, less than 2 µm, or less than 1 µm. The beam spots 82, 84 can have equal or similar sizes on the projection surface 18 if the laser units 50, 100 have equal or similar divergence angles, for example. For example, the divergence can be less than 5°, for example, less than 2° or less than 1°, applicable in each case for both axes.

FIG. 9 shows a flow chart of an embodiment of a method for simultaneously displaying the two images, for example, the two images 90, 92, on the projection surface 18.

In a step S10, a first illumination beam, for example, the first illumination beam 13, is generated. The first illumination beam 13 is generated in dependence on the first image data, which are representative of the first image 90 for the first observer. In particular, a current color mixture of the first illumination beam 13 is dependent on the first image data. The color mixture is achieved in this context, for example, by a mixture of the first partial beams 28. Different mixtures can be generated, for example, by different intensities of the individual first partial beams 28.

In a step S12, a second illumination beam, for example, the second illumination beam 15, is generated. The second illumination beam 15 is generated in dependence on the second image data, which are representative of the second image 92 for the second observer. In particular, a current color mixture of the second illumination beam 15 is dependent on the second image data. The color mixture is achieved in this context, for example, by a mixture of the second partial beams 38. Different mixtures can be generated, for example, by different intensities of the individual second partial beams 28.

In a step S14, the two illumination beams 13, 15 are deflected toward the projection surface 18, specifically so that the corresponding images 90, 92 are displayed on the projection surface 18. For example, the first illumination beam 13 and the second illumination beam 15 are deflected simultaneously onto the projection surface 18.

In a step S16, the two images 90, 92 are displayed mutually superimposed simultaneously on the same projection surface 18. Additionally, one, two, or more further images 93 can simultaneously also be displayed for further observers on the same projection surface 18. Furthermore, still further first images, for example, a first slideshow or a first film, can be displayed successively for the first observer, and/or further second images, for example, a second slideshow or a second film, can be displayed successively for the second observer, and/or a computer game can be displayed from a first perspective for the first observer and from a second perspective for the second observer, on the same projection surface 18.

FIG. 10 shows a further embodiment of the projector 10. The elements of this embodiment substantially correspond to the elements of the embodiment of the projector 10 shown in FIG. 1. The essential difference of the two embodiments is that the projector according to FIG. 10 has a third illumination arrangement 110. The third illumination arrangement 110 generates a third illumination beam 112, with the aid of which the third image 93 can be displayed for the third observer on the projection surface, while the first and the second images 90, 92 are displayed on the projection surface 18. The third illumination arrangement 110 is implemented, for example, so that the third illumination beam 112 has light having wavelengths of a third color space. The third color space has light from different wavelength ranges than the first and the second color spaces. For example, the central wavelength in the green color range is at 505 nm in the first color space, at 515 nm in the second color space, and at 525 nm in the third color space.

If a further illumination arrangement is arranged, a fourth image could be displayed for a fourth observer on the projection surface 18, for example, with the aid of a fourth illumination beam, which has electromagnetic radiation of a fourth color space, in which the central wavelength of the green color range, for example, can be approximately 535 nm, for example. The separation of the color spaces in the case of the fourth observer is then performed via correspondingly designed fourth filter spectacles. The third color space is a third property of the electromagnetic radiation and the fourth color space is a fourth property of the electromagnetic radiation.

In the event of sufficient selectivity of the filter spectacles, one, two, or more further color spaces could also be generated with the aid of further illumination arrangements, and further images can thus be generated on the projection surface simultaneously with the first and the second images 90, 92. Alternatively or additionally, the selectivity can be increased by combination of the different color spaces with the different polarization of the electromagnetic radiation.

The third color space differs from the first and the second color spaces. In other words, the third illumination beam 112 spans the third color space. With the aid of the third illumination beam 112, the third image 93 is displayed for the third observer on the projection surface 18. In this manner, for example, three different observers can simultaneously see three different images, in particular having different contents, films, and/or computer animations, on the same projection surface 18. For example, three observers can simultaneously see the same computer game, for example, from different perspectives on the same projection surface 18.

Alternatively or additionally to the separation of the third image from the first and the second images, the separation can also be achieved via different polarizations, corresponding to the above-explained separation of the first image 90 from the second image 92 by means of polarization of the first illumination beam 13 and the second illumination beam 15.

A separation of the images 90, 92, 93 on the part of the third observer is then performed via the third filter spectacles, which have a third optical filter, which transmits light having the third property and filters out light having the first and/or second property for the third observer.

The projector 10 according to one of the above-explained embodiments can generate white light with 30 lumen, for example, if all radiation sources of an illumination arrangement 12, 14 are active, for example. This can require a high wavelength in the red color range, for example, because of which a high C6 factor is necessary with regard to the eye safety (see IEC 60825-13 edition two). This can be achieved, for example, in that a mirror of the deflection device has a suitable size or is operated in combination with a suitable lens.

The present disclosure is not restricted to the specified embodiments. For example, the polarization filters 43, 44 can be integrated in the illumination arrangements 13, 15. The projection device according to the present disclosure may also include more than two illumination arrangements, for example, three or four, so that more than two images or films can be projected simultaneously on the projection surface for correspondingly more than two observers, for example, three or four. Furthermore, the concept of the separation of the images for the different observers by use of different color spaces is also transferable to the nonvisible ranges of light or electromagnetic radiation, for example, electromagnetic radiation, the wavelength ranges of which are in the UV light range and/or in the infrared light range, can be used to display the images. The use of the term "color space" then only relates to the aggregation of different wavelength ranges and no longer to colors which are actually perceptible by humans without aids. Therefore, in this application the term "light" is synonymous with the term "radiation" and the term "color" is synonymous for radiation of a wavelength range, which awakens a specific color or gray impression in an observer—with or without aids, for example, filter spectacles. The images are then recognizable for the observer or observers with the aid of filter spectacles, which have low light amplification in the case of infrared radiation and have a corresponding optical filter in the case of UV radiation. This allows a projection of image data such that they are exclusively recognizable with the aid of the filter spectacles and are invisible for any person without corresponding spectacles.

The projection device according to the present disclosure can be used, for example, in video and data projection, for the projection of computer games, in which multiple gamers each see the sequences assigned thereto on the same projection surface, and/or in which the game users can interactively select or influence the output of their game or film independently of the other gamers. The projection device according to the present disclosure can be used for technical, medical, and informative augmented reality projection and also in rear projection television devices.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS 10 projector
12 first illumination arrangement
13 first illumination beam
14 second illumination arrangement
15 second illumination beam
16 first deflection unit
17 modulator
18 projection surface
20 direction cross
22 first radiation source
24 second radiation source
26 third radiation source
28 first partial beams
32 fourth radiation source
34 fifth radiation source
36 sixth radiation source
38 second partial beams
40 video processor
41 first activation unit
42 second activation unit
43 first polarization filter
44 second polarization filter
45 second deflection unit
50 first laser unit
52 first conversion element
54 first carrier
56 collimation lens
56a first collimation lens
56b second collimation lens
56c third collimation lens 58 filter
62 first wavelength range
64 second wavelength range
66 third wavelength range
72 fourth wavelength range
74 fifth wavelength range
76 sixth wavelength range
82 first beam spot
84 second beam spot
86 first direction
88 second direction
90 first image
92 second image
93 third image
94 red partial beam
96 green partial beam
98 blue partial beam
100 second laser unit
102 second conversion element
104 second carrier
S10-S16 steps 10 to 16

The invention claimed is:

1. A method for simultaneously projecting two images onto a projection surface, the method comprising:
generating a first illumination beam in dependence on first image data, which are representative of a first image, wherein the first illumination beam has electromagnetic radiation having a predefined first property;
generating a second illumination beam in dependence on second image data, which are representative of a second image, wherein the second illumination beam has electromagnetic radiation having a predefined second property, which differs from the first property; and
deflecting the first and second illumination beams toward the projection surface so that the first illumination beam generates a first beam spot on the projection surface and the second illumination beam generates a second beam spot on the projection surface, wherein the first beam spot is moved over the projection surface so that with the aid of the first beam spot, the first image is displayed for a first observer on the projection surface, and the second beam spot is moved over the projection surface so that with the aid of the second beam spot, the second image is displayed for a second observer on the projection surface, superimposed on the first image.

2. The method as claimed in claim 1, wherein colored illumination light of a first color space is used as electromagnetic radiation having the predefined first property and wherein colored illumination light of a second color space, which differs from the first color space, is used as electromagnetic radiation having the predefined second property.

3. The method as claimed in claim 2, wherein the first and the second color spaces are selected so that the same white spot is displayable using both color spaces.

4. The method as claimed in claim 1, wherein electromagnetic radiation having a first polarization is used as electromagnetic radiation having the predefined first property and wherein electromagnetic radiation having a second polarization, which differs from the first polarization, is used as electromagnetic radiation having the predefined second property.

5. The method as claimed in claim 1, wherein the two beam spots are projected superimposed on one another on the projection surface.

6. The method as claimed in claim 1, the method further comprising:
generating a third illumination beam in dependence on third image data, which are representative of a third image, wherein the third illumination beam has electromagnetic radiation having a predefined third property, which differs from the first and second properties; and
deflecting the third illumination beam toward the projection surface so that the third illumination beam generates a third beam spot on the projection surface, wherein the third beam spot is moved over the projection surface so that, with the aid of the third beam spot, during the display of the first and second images for the first and the second observers, the third image is displayed for a third observer on the projection surface, superimposed on the first and the second images.

7. A projector for simultaneously projecting two images onto a projection surface, the projector comprising:
a first illumination arrangement, which generates a first illumination beam in dependence on first image data, which are representative of a first image, wherein the first illumination beam has electromagnetic radiation having a predefined first property;
a second illumination arrangement, which generates a second illumination beam in dependence on second image data, which are representative of a second image, wherein the second illumination beam has electromagnetic radiation having a predefined second property, which differs from the first property; and
a deflection device, which is implemented so that it deflects the first and the second illumination beams toward the projection surface so that the first illumination beam generates a first beam spot on the projection surface and the second illumination beam generates a second beam spot on the projection surface, wherein the first beam spot is moved over the projection surface so that with the aid of the first beam spot, the first image is displayed for a first observer on the projection surface, and the second beam spot is moved over the projection surface so that with the aid of the second beam spot, the second image is displayed for a second observer on the projection surface, superimposed on the first image.

8. The projector as claimed in claim 7, wherein the first illumination arrangement is implemented so that it generates electromagnetic radiation of a first color space, and wherein the second illumination arrangement is implemented so that it generates electromagnetic radiation of a second color space, which differs from the first color space.

9. The projector as claimed in claim 8, wherein the first illumination arrangement comprises:
a first radiation source, which is implemented so that it generates electromagnetic radiation of a first wavelength range,
a second radiation source, which is implemented so that it generates electromagnetic radiation of a second wavelength range,
a third radiation source, which is implemented so that it generates electromagnetic radiation of a third wavelength range, wherein the electromagnetic radiation of the first, second, and third wavelength ranges spans the first color space; and
wherein the second illumination arrangement comprises:
a fourth radiation source, which is implemented so that it generates electromagnetic radiation of a fourth wavelength range,
a fifth radiation source, which is implemented so that it generates electromagnetic radiation of a fifth wavelength range,
a sixth radiation source, which is implemented so that it generates electromagnetic radiation of a sixth wavelength range, wherein the electromagnetic radiation of the fourth, fifth, and sixth wavelength ranges spans the second color space.

10. The projector as claimed in claim 7, wherein the first illumination arrangement generates electromagnetic radiation of a first polarization and wherein the second illumination arrangement generates electromagnetic radiation of a second polarization, which differs from the first polarization.

11. The projector as claimed in claim 10, wherein the first illumination arrangement has a first polarization filter for generating the electromagnetic radiation of the first polarization and wherein the second illumination arrangement has a second polarization filter for generating the electromagnetic radiation of the second polarization.

12. The projector as claimed in claim 7, wherein the deflection device has a first deflection unit for deflecting the first illumination beam and a second deflection unit for deflecting the second illumination beam.

13. The projector as claimed in claim 9, wherein in each case one of the wavelength ranges of the first color space in a wavelength spectrum is adjacent to one of the wavelength ranges of the second color space, wherein the electromagnetic radiation of the two adjacent wavelength ranges has the same color, and wherein the radiation sources, which generate the electromagnetic radiation of the corresponding wavelength ranges, are arranged adjacent to one another.

14. The projector as claimed in claim 13, further comprising multiple optical elements for deflecting and/or guiding the illumination beams to the deflection device, wherein the optical elements are implemented and arranged so that the illumination beams of two adjacent radiation sources are deflected and/or guided via the same optical elements to the deflection device.

15. The projector as claimed in claim 7, further comprising:
a third illumination arrangement, which generates a third illumination beam in dependence on third image data, which are representative of a third image,
wherein the third illumination beam has electromagnetic radiation having a predefined third property, which differs from the first and second properties;
wherein the deflection device deflects the third illumination beam toward the projection surface so that the third illumination beam generates a third beam spot on the projection surface,
wherein the third beam spot is moved over the projection surface so that with the aid of the third beam spot, the third image is displayed for a third observer on the projection surface, superimposed on the first and second images.

* * * * *